No. 757,077. PATENTED APR. 12, 1904.
F. B. WHIPPLE.
FISHING APPARATUS.
APPLICATION FILED NOV. 17, 1902.
NO MODEL.
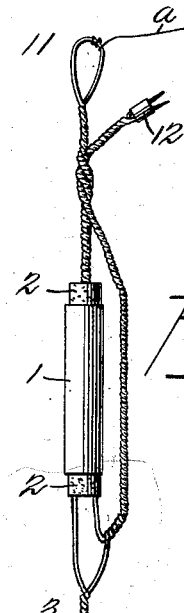
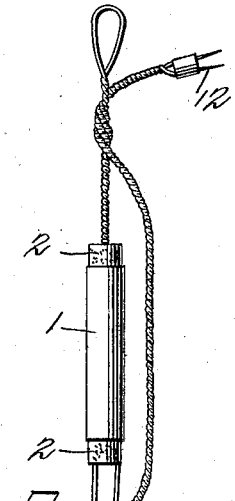
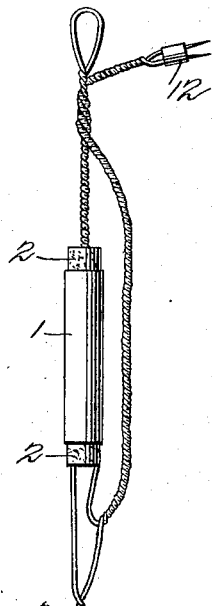
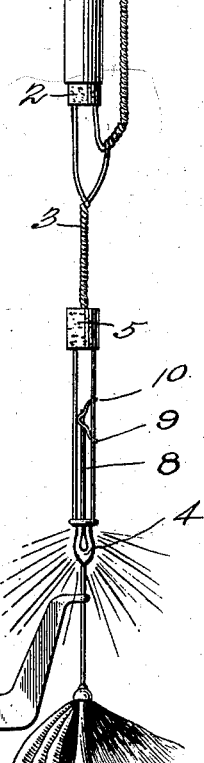
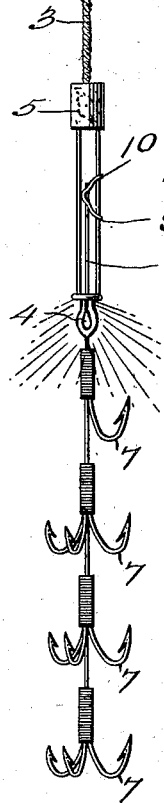
F. B. Whipple,
Inventor No. 757,077. Patented April 12, 1904.

UNITED STATES PATENT OFFICE.

FRANK B. WHIPPLE, OF GENESEO, NEW YORK.

FISHING APPARATUS.

SPECIFICATION forming part of Letters Patent No. 757,077, dated April 12, 1904.

Application filed November 17, 1902. Serial No. 131,774. (No model.)

*To all whom it may concern:*

Be it known that I, FRANK B. WHIPPLE, a citizen of the United States, residing at Geneseo, in the county of Livingston and State of New York, have invented certain new and useful Improvements in Fishing Apparatus; and I do declare the following to be a full, clear, and exact description of the invention, such as will enable others skilled in the art to which it appertains to make and use the same.

My invention is an improved fishing apparatus especially adapted for use in connection with fishing-lines, whether for still fishing or trolling, but also adapted for use in connection with nets and other devices; and it consists in the peculiar form and construction of devices hereinafter fully described, and pointed out in the appended claims.

The object of my invention is to provide a fishing apparatus having a battery and an electrically-operated luminous lure, such as a miniature incandescent electric lamp, operable thereby, connected to the line and adapted to be cast into the water together to avoid the necessity of employing conductors of inconvenient length between the battery and the lure-lamp, as has been heretofore necessary in devices of this class.

A further object of my invention is to connect a buoyant device, one or more, to the battery to partially sustain the weight of the latter in the water to relieve the line or tackle of the otherwise inconvenient weight of the battery while fishing.

A further object of my invention is to effect improvements in the connection between the hook or victim-detaining device and the lure-lamp to prevent the latter from being broken while fishing.

In the accompanying drawings, Figure 1 is an elevation of the fishing-tackle provided with an apparatus embodying my improvements. Fig. 2 is a similar view illustrating a modification. Fig. 3 is a similar view illustrating another modification.

In the embodiment of my invention I provide a battery 1, which may be of any suitable kind and form and which is attached to the line or tackle or other fishing device used and thrown overboard when the line is cast.

As shown in Fig. 1, the battery 1 is provided at its extremities with corks 2 to partially sustain the weight of the latter in the water to relieve the line or tackle of the otherwise inconvenient weight or pull of the battery while fishing. Conducting-wires 3, properly insulated, lead from the poles of the battery to the lure-lamp 4, which is here shown as a miniature incandescent lamp of well-known type. The respective conducting-wires are separated for a suitable distance from the lure-lamp by a spreader 5, which may be a cork or any other suitable device either of cylindrical or other suitable form.

The victim-detaining device shown in Fig. 1 is a fly having a hook 6. In Fig. 2 there are a plurality of hooks 7. The victim-detaining device is connected by a snell 8 to a spring 10, which is slidable on one of the conducting-wires between the lamp and the spreader, forms a cushion, and when the hook is taken by the fish prevents the lamp or the globe thereof from being broken by the efforts of the fish to escape.

In Fig. 1 of the drawings the conducting-wires between the battery and the lure-lamp are provided with a loop 11 for the attachment of the fishing-line $a$ and with the circuit-closer 12, by means of which the battery-current may be established or broken at will.

In Fig. 3 of the drawings the globe of the electric light is shown as in the form of a glass minnow $4^a$. It will be understood that the lure-lamp may be of any suitable form, and I do not limit myself in this particular.

From the foregoing description, taken in connection with the accompanying drawings, it is thought that the construction, operation, and advantages of my improved fishing apparatus will be readily understood without requiring a more extended explanation.

Various changes in the form, proportion, and the minor details of construction may be resorted to without departing from the principle or sacrificing any of the advantages of this invention.

Having thus described my invention, what I claim, and desire to secure by Letters Patent, is—

1. In apparatus of the class described, the combination of a lure, a victim-detaining device, and a slidable connection between them, said slidable connection including a yieldable element, substantially as described.

2. In combination with a victim-detaining device, an electric lamp, a battery connected thereto, and buoyant means to partially sustain the weight of the battery in the water, substantially as described.

3. Fishing apparatus provided with a battery having a light-emitting luring element operated thereby, buoyant means to partially sustain the weight of the battery in the water, and a victim-detaining element, substantially as described.

4. A fishing-line having a battery, buoyant means to partially sustain the weight of the battery in the water, a light-emitting luring element operated by the battery, and a victim-detaining element, substantially as described.

5. Fishing apparatus including a battery, buoyant means to partially sustain the weight of the battery in the water, and a luminous lure operated by the battery, substantially as described.

6. A fishing apparatus including a battery and an electrically-luminous lure operated thereby, closely connected thereto and adapted to be cast into the water therewith, substantially as described.

7. A fishing apparatus having a battery and an electrically-luminous lure operable thereby, connected thereto and adapted to be cast into the water therewith, substantially as described.

8. A fishing apparatus having a battery, an electric lamp operated thereby, and a victim-detaining device, all connected and adapted to be placed in the water together, substantially as described.

9. A fishing-line having a battery, an electric lamp operated thereby, a victim-detaining device, all connected together and adapted to be cast in the water, and buoyant means to partially sustain the weight of the battery in the water and correspondingly lessen the pull thereof on the line, substantially as described.

10. A fishing apparatus comprising an electric light, a battery and a bait, all closely connected and adapted to be placed in the water together, and a line attached thereto, substantially as described.

In testimony whereof I have hereunto set my hand in presence of two subscribing witnesses.

FRANK B. WHIPPLE.

Witnesses:
Wm. L. S. Olmsted,
Chas. A. Gibson.